(12) United States Patent
Barbier et al.

(10) Patent No.: US 11,364,768 B2
(45) Date of Patent: Jun. 21, 2022

(54) HVAC INLET SUBASSEMBLY

(71) Applicant: DENSO International America, Inc., Southfield, MI (US)

(72) Inventors: Eric Barbier, Southfield, MI (US); Brian Belanger, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 250 days.

(21) Appl. No.: 16/818,721

(22) Filed: Mar. 13, 2020

(65) Prior Publication Data

US 2020/0406709 A1 Dec. 31, 2020

Related U.S. Application Data

(60) Provisional application No. 62/866,294, filed on Jun. 25, 2019.

(51) Int. Cl.
*B60H 1/10* (2006.01)
*F24F 1/028* (2019.01)
*F24F 13/10* (2006.01)
*B60H 1/00* (2006.01)

(52) U.S. Cl.
CPC ................................ *B60H 1/00849* (2013.01)

(58) Field of Classification Search
CPC ............ B60H 1/00821; B60H 1/00835; B60H 1/00842; B60H 1/00849; B60H 1/00864; F24F 1/00; F24F 13/04; F24F 13/10; F24F 2140/40; F24F 1/028
See application file for complete search history.

(56) References Cited

U.S. PATENT DOCUMENTS

| 3,212,424 | A | * | 10/1965 | Davis | F24F 3/0522 454/268 |
|---|---|---|---|---|---|
| 2012/0214394 | A1 | * | 8/2012 | Kanemaru | B60H 1/00678 454/139 |
| 2014/0065943 | A1 | * | 3/2014 | Clemence | B60H 1/24 454/265 |
| 2015/0024669 | A1 | * | 1/2015 | Gesell | B60H 1/24 454/75 |
| 2016/0082804 | A1 | * | 3/2016 | Kim | B60H 1/0075 165/203 |
| 2016/0229266 | A1 | * | 8/2016 | Maeda | B60H 1/00849 |
| 2017/0305230 | A1 | * | 10/2017 | Sekito | B60H 1/00057 |

* cited by examiner

*Primary Examiner* — Frantz F Jules
*Assistant Examiner* — Jason N Thompson
(74) *Attorney, Agent, or Firm* — Harness, Dickey & Pierce, P.L.C.

(57) ABSTRACT

An inlet subassembly for a heating, ventilation, and air conditioning (HVAC) system. The inlet subassembly includes a fresh air inlet and a fresh air door movable to control fresh airflow through the fresh air inlet. The inlet subassembly further includes a recirculation air inlet and a partition defining a first airflow channel and a second airflow channel extending from the recirculation air inlet. A recirculation air door is adjacent to the recirculation air inlet and is movable to a closed position restricting recirculated airflow into both the first airflow channel and the second airflow channel, an open position permitting recirculated airflow into both the first airflow channel and the second airflow channel, and a two-layer position in which the recirculation air door restricts recirculated airflow into the first airflow channel and permits recirculated airflow into the second airflow channel.

17 Claims, 6 Drawing Sheets

HVAC INLET SUBASSEMBLY

CROSS-REFERENCE TO RELATED APPLICATION

This application claims the benefit of U.S. Provisional Application No. 62/866,294 filed on Jun. 25, 2019, the entire disclosure of which is incorporated herein by reference.

FIELD

The present disclosure relates to an inlet subassembly for an HVAC system, such as a dual or two-layer HVAC system.

BACKGROUND

This section provides background information related to the present disclosure, which is not necessarily prior art.

Vehicle heating, ventilation, and air conditioning (HVAC) systems may be configured as dual or two-layer systems. A two-layer system allows for independent airflow management in the upper and lower cabin of the vehicle. Specifically, internal warm air is recirculated at the lower half of the passenger cabin, and external fresh air is routed through the upper half of the passenger cabin, thereby improving heating efficiency and more effectively preventing window fogging. While existing two-layer HVAC systems are suitable for their intended use, they are subject to improvement. The present disclosure advantageously provides for an improved inlet subassembly for an HVAC system, such as a two-layer HVAC system

SUMMARY

This section provides a general summary of the disclosure, and is not a comprehensive disclosure of its full scope or all of its features.

The present disclosure includes an inlet subassembly for a heating, ventilation, and air conditioning (HVAC) system. The inlet subassembly includes a fresh air inlet and a fresh air door movable to control fresh airflow through the fresh air inlet. The subassembly further includes a recirculation air inlet and a partition defining a first airflow channel and a second airflow channel extending from the recirculation air inlet. A recirculation air door is adjacent to the recirculation air inlet and is movable to a closed position restricting recirculated airflow into both the first airflow channel and the second airflow channel, an open position permitting recirculated airflow into both the first airflow channel and the second airflow channel, and a two-layer position in which the recirculation air door restricts recirculated airflow into the first airflow channel and permits recirculated airflow into the second channel.

The present disclosure further includes an inlet subassembly for a heating, ventilation, and air conditioning (HVAC) system. The subassembly includes a partition defining a first airflow channel and a second airflow channel extending from a recirculation air inlet to a filter and an evaporator of the inlet subassembly. A recirculation air door is rotatable about a first rotation axis to a closed position restricting recirculated airflow into both the first airflow channel and the second airflow channel, an open position permitting recirculated airflow into both the first airflow channel and the second airflow channel, and a two-layer position in which the recirculation air door restricts recirculated airflow into the first airflow channel and permits recirculated airflow into the second channel. A first fresh air inlet is in fluid communication with the first airflow channel, and a first fresh air door is at the first fresh air inlet. A second fresh air inlet is in fluid communication with the second airflow channel, and a second fresh air door is at the second fresh air inlet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
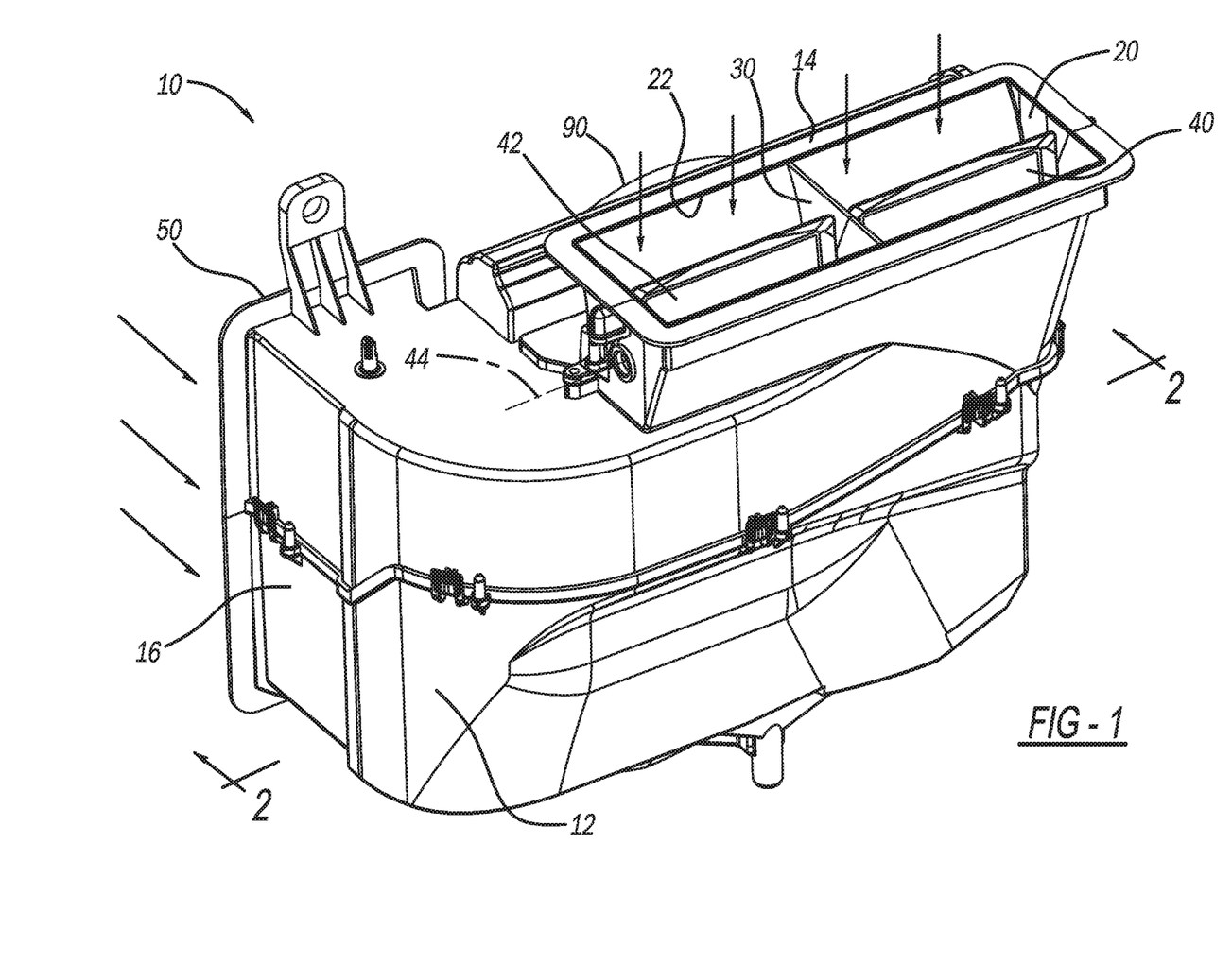
FIG. 1 is a perspective view of a heating, ventilation, and air conditioning (HVAC) system inlet subassembly in accordance with the present disclosure.
Figure 2:
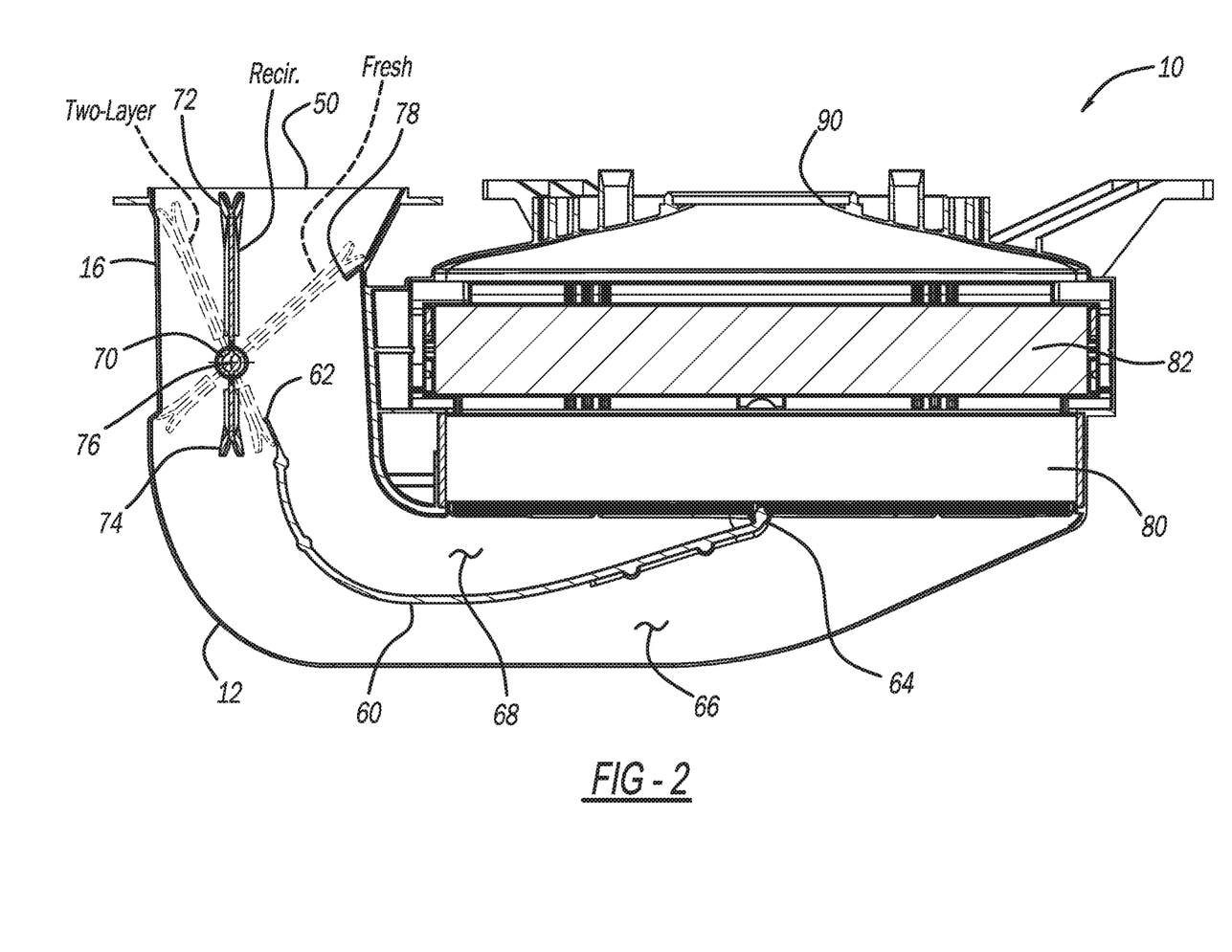
FIG. 2 is a cross-sectional view of the inlet subassembly of FIG. 1 taken along line 2-2 of FIG. 1.

FIGS. 1 and 2 illustrate an exemplary inlet subassembly 10 in accordance with the present disclosure. The inlet subassembly 10 is configured for use with any suitable heating, ventilation, and air conditioning (HVAC) system, such as a vehicle HVAC system. The vehicle HVAC system may be configured for use with any suitable vehicle, such as any suitable passenger vehicle, mass transit vehicle, recreational vehicle, utility vehicle, construction vehicle/equipment, military vehicle/equipment, watercraft, aircraft, etc. The inlet subassembly 10 may also be configured for use with any suitable non-vehicular application, such as a building HVAC system.

The inlet subassembly 10 includes a housing 12. The housing 12 generally includes a top or upper surface 14, and a side surface 16. At the upper surface 14, the housing 12 defines a first fresh air inlet 20 and a second fresh air inlet 22. The first and second fresh air inlets 20, 22 are separated by a first partition 30.

The first and second fresh air inlets 20, 22 are in receipt of fresh airflow from an exterior of the vehicle, such as by way of any suitable piping or other airflow conduit. The flow of fresh air through the first fresh air inlet 20 is controlled by a first fresh air door 40. The control of fresh airflow through the second fresh air inlet 22 is controlled by a second fresh air door 42. The first and second fresh air doors 40, 42 are on opposite sides of the first partition 30.

Figure 5A:
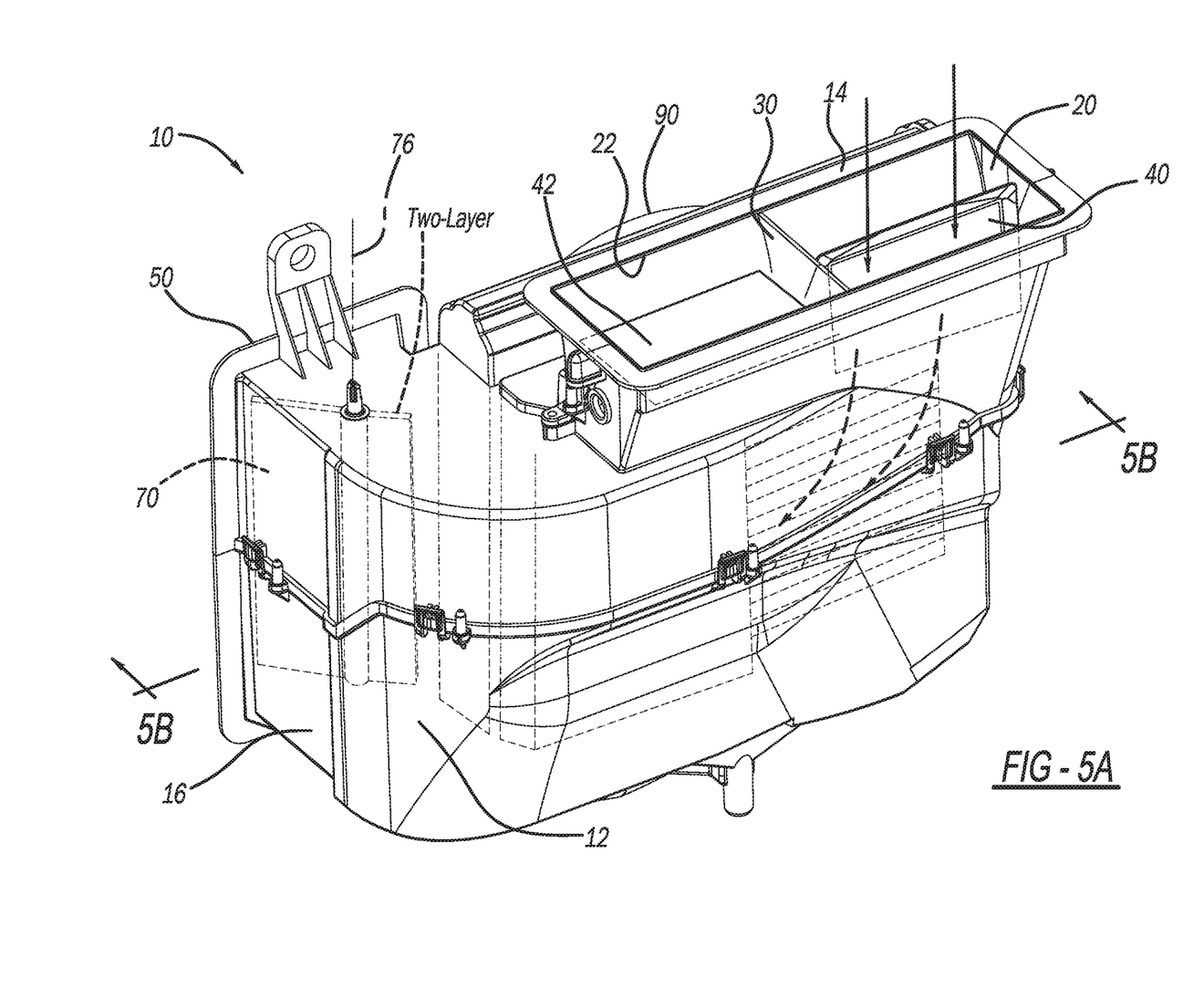
FIG. 5A is a perspective view of the inlet subassembly of FIG. 1 in a two-layer mode in which both fresh air and recirculated air flows through the inlet subassembly.
Figure 5B:
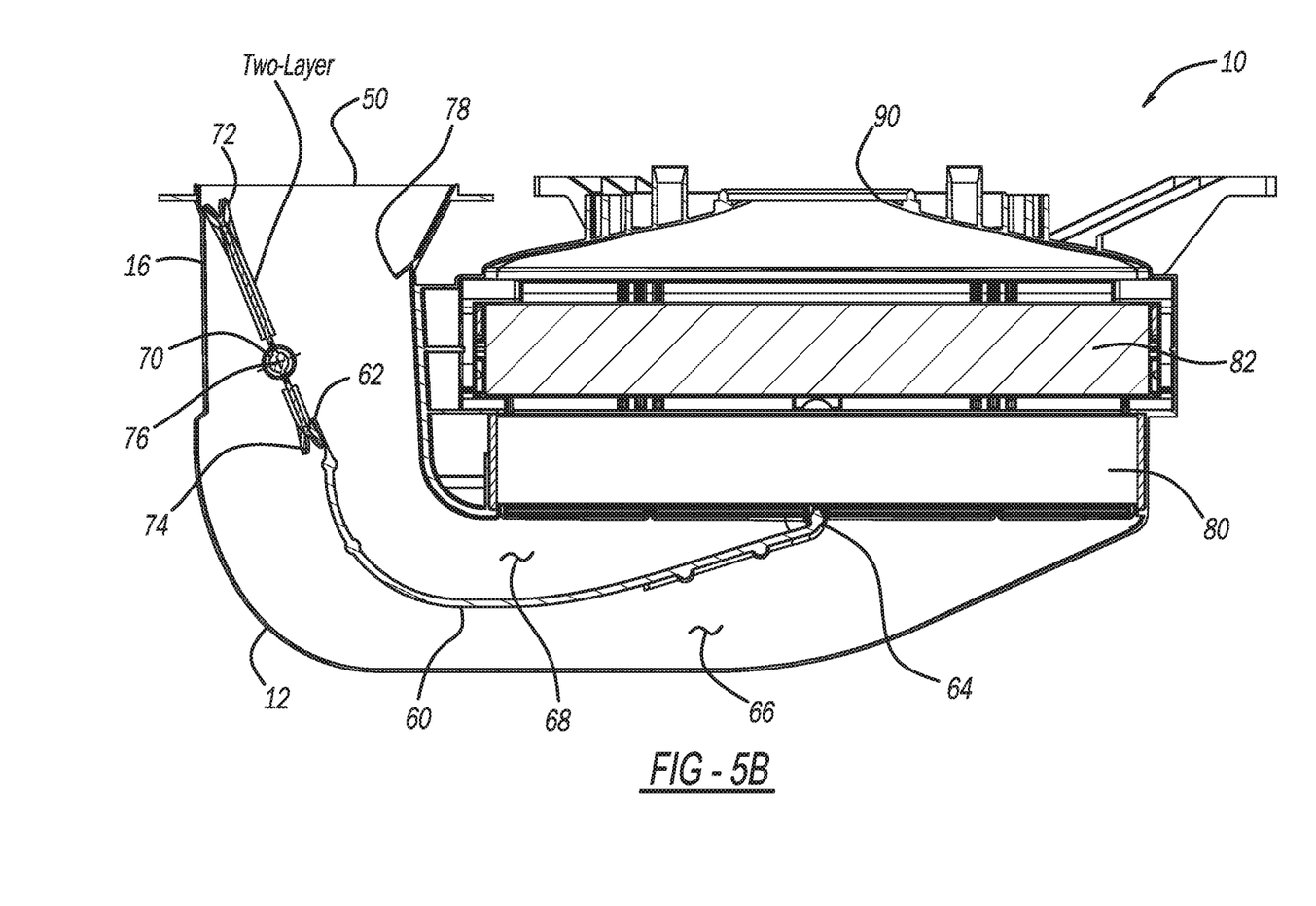
FIG. 5B is a cross-sectional view taken along line 5B-5B of FIG. 5A.

The first and second fresh air doors 40, 42 may be rotated in any suitable manner, such as by any suitable servo. In the example illustrated, the first fresh air door 40 and the second fresh air door 42 are both rotatable about a common rotation axis 44. The first and second fresh air doors 40, 42 may be rotated to open positions in which the first and second fresh air doors 40, 42 permit fresh air to flow into the inlet subassembly 10 through the first and second fresh air inlets 20, 22. The first and second fresh air doors 40, 42 may also be rotated to closed positions in which the first and second fresh air doors 40, 42 block fresh air from flowing into the inlet subassembly 10. In a two-layer mode, the first fresh air door 40 is rotated to the open position and the second fresh air door 42 is rotated to the closed position, as illustrated in FIGS. 5A and 5B.

The housing 12 of the inlet subassembly 10 further defines a recirculation inlet 50. The recirculation inlet 50 is arranged at the side surface 16 of the housing 12. Thus, the recirculation inlet 50 faces in a direction that is generally perpendicular to, or about 90° relative to, the first and second fresh air inlets 20, 22. The recirculation inlet 50 receives recirculated airflow from a passenger cabin of the vehicle either directly or indirectly, such as by way of any suitable piping or other conduit.

With particular reference to FIG. 2, the inlet subassembly 10 includes a second partition 60. The second partition 60 has a first end 62 and a second end 64. The first end 62 is near the recirculation inlet 50. The second partition 60 generally defines a first airflow channel 66 and a second airflow channel 68 within the housing 12. The first channel 66 and the second channel 68 are separated by the second partition 60, and are arranged on opposite sides of the second partition 60. Between the recirculation inlet 50 and the first end 62 of the second partition 60 is a recirculation door 70.

Each one of the first and second channels 66, 68 extends from the recirculation door 70 to a filter 80 of the inlet subassembly 10. Airflow passing through the first and second channels 66, 68 flows through the filter 80 and an evaporator 82. From the evaporator 82, the airflow exits the inlet subassembly 10 through an outlet 90. From the outlet 90, the airflow flows to any suitable two-layer HVAC blower and two-layer heater case for distribution of the airflow throughout the passenger cabin of the vehicle in which the inlet subassembly 10 is installed.

The first and second fresh air inlets 20, 22 are vertically aligned with the first channel 66 and the second channel 68 respectively, proximate to the second end 64 of the second partition 60. The first partition 30 is generally vertically aligned with the second end 64 of the second partition 60. Thus, fresh air flowing through the first fresh air inlet flows into the first channel 66 proximate to the second end 64 of the second partition 60 and is blocked by the second partition 60 from flowing into the second channel 68. Likewise, fresh air flowing through the second fresh air inlet 22 flows into the second channel 68 proximate to the second end 64 and is prevented from flowing into the first channel 66 by the second partition 60. Airflow from the first channel 66 and the second channel 68 remains separate as the airflow flows through the filter 80 and the evaporator 82 to the outlet 90.

With particular reference to FIG. 2, the recirculation door 70 includes a first end 72 and a second end 74, which is opposite to the first end 72. The recirculation door 70 may be any suitable door mounted in any suitable manner to control flow of recirculation airflow into the first and second channels 66 and 68 of the inlet subassembly 10. In the example illustrated, the recirculation door 70 is rotatable about an axis 76, which extends in a direction perpendicular to the axis 44 of the first and second fresh air doors 40, 42.

The recirculation door 70 is movable between a "Recirc." position, a "Fresh" position, and a "Two-Layer" position. In the "Recirc." position, the recirculation door 70 extends generally parallel to recirculated airflow flowing to the recirculation inlet 50 to allow recirculated airflow to flow into the inlet subassembly 10 generally unobstructed. The recirculation door 70 is rotatable in a clockwise direction to the "Fresh" position to seal the first end 72 against a tab 78 of the housing 12 and seal the second end 74 against an inner surface of the housing 12. In the "Fresh" position, the recirculation door 70 blocks recirculation airflow from entering the inlet subassembly 10. The recirculation door 70 is rotatable in a counterclockwise direction to the "Two-Layer" position in which the second end 74 of the recirculation door 70 seals against the first end 62 of the second partition 60, and the first end 72 seals against the inner surface of the housing 12. In the "Two-Layer" position, the recirculation door 70 permits recirculated airflow to enter the second channel 68, but not the first channel 66.

Figure 3:
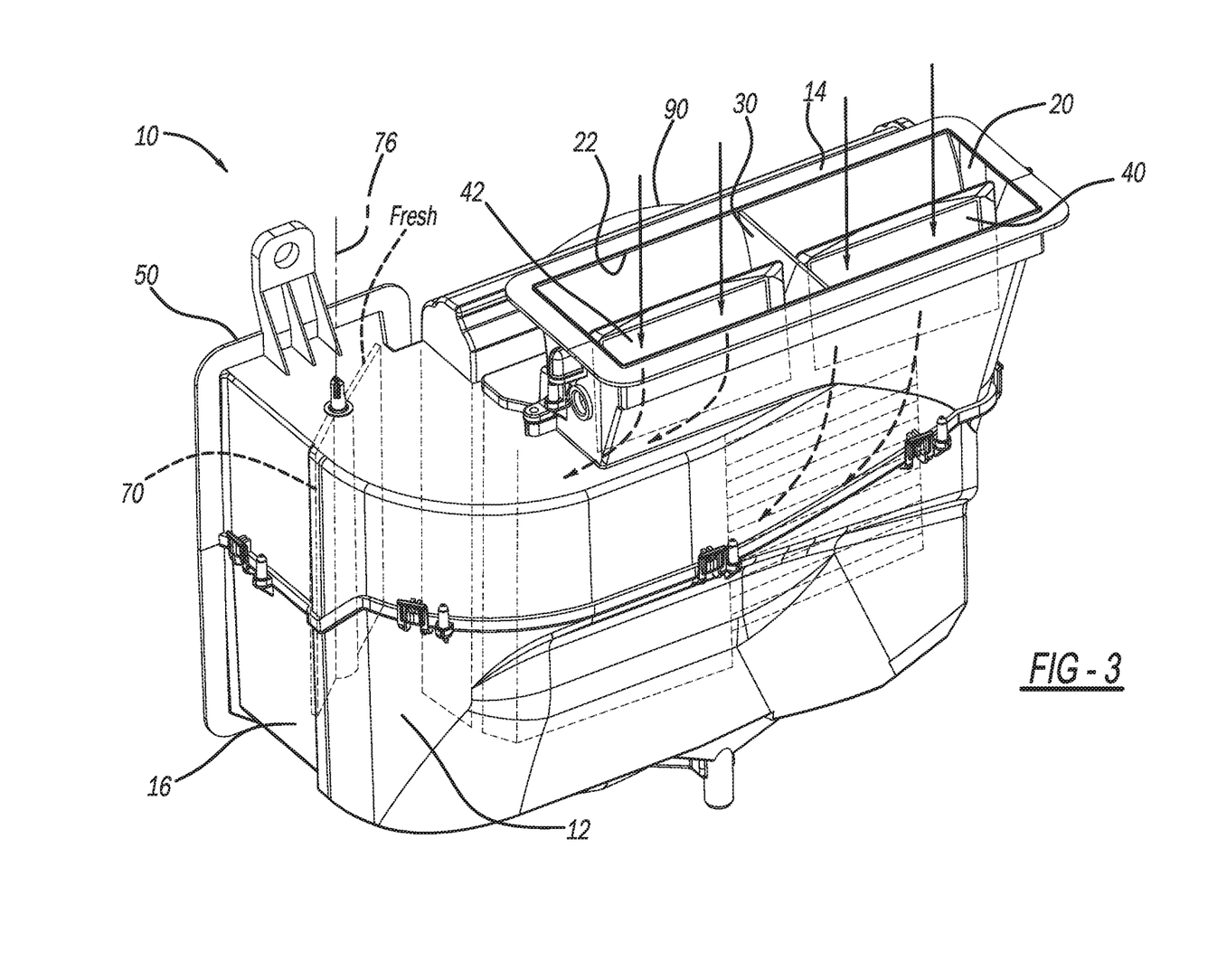
FIG. 3 is a perspective view of the inlet subassembly of FIG. 1 in a fresh air mode.

With continued reference to FIGS. 1 and 2, and additional reference to FIGS. 3-5B, the different modes of the inlet subassembly 10 will be described in greater particularity. FIG. 3 illustrates the inlet subassembly 10 configured in a fresh air mode. In the fresh air mode, both the first fresh air door 40 and the second fresh air door 42 are open, and the recirculation door 70 is in the closed "Fresh" position to block recirculation airflow into the first channel 66 and the second channel 68. In this fresh air configuration, fresh air flows into the inlet subassembly 10 through each one of the first fresh air inlet 20 and the second fresh air inlet 22. From the first fresh air inlet 20, fresh air flows into the first channel 66, through both the filter 80 and the evaporator 82, and out of the inlet subassembly 10 through the outlet 90. Similarly, fresh air flows in through the second fresh air inlet 22 into the second channel 68. From the second channel 68, the fresh air flows through the filter 80 and the evaporator 82, and out of the inlet subassembly 10 through the outlet 90. Because the recirculation door 70 is closed, the fresh air cannot exit the inlet subassembly 10 through the recirculation inlet 50. From the outlet 90, the fresh air flows through any suitable HVAC blower and heater case into the passenger cabin.

Figure 4:
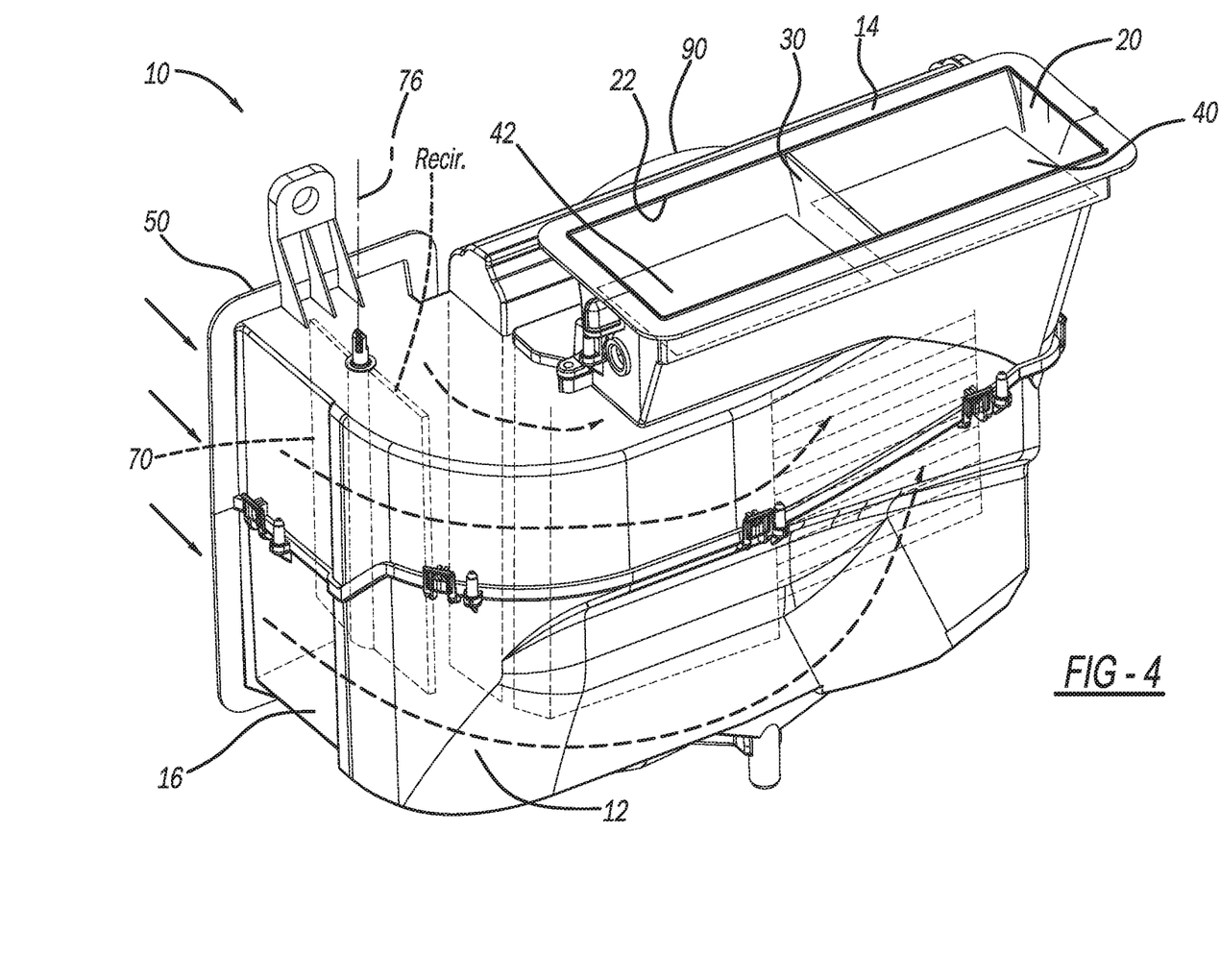
FIG. 4 is a perspective view of the inlet subassembly of FIG. 1 in a recirculation mode.

FIG. 4 illustrates the inlet subassembly 10 in the recirculation mode. In the recirculation mode, both the first fresh air door 40 and the second fresh air door 42 are closed to prevent fresh air from entering the inlet subassembly 10 through the first fresh air inlet 20 and the second fresh air inlet 22. The recirculation door 70 is arranged in the fully open "Recirc." position to allow recirculated air to flow into the inlet subassembly 10 and into both the first channel 66 and the second channel 68. The recirculated airflow passes through both the first channel 66 and the second channel 68, through the filter 80 and the evaporator 82, and exits the inlet subassembly 10 through the outlet 90. From the outlet 90, the recirculated airflow flows through any suitable HVAC blower and heater case, which directs the airflow to desired areas of the passenger cabin.

FIGS. 5A and 5B illustrate the inlet subassembly 10 in a two-layer mode. In the two-layer mode, the first fresh air door 40 is open and the second fresh air door 42 is closed. The recirculation door 70 is partially open in the "Two-Layer" position to allow recirculated airflow to flow into the second channel 68, but block recirculated airflow from flowing into the first channel 66. Specifically, the second end 74 of the recirculation door 70 seals against the first end 62 of the second partition 60, and the first end 72 seals against an interior surface of the housing 12. Thus in the two-layer mode, fresh air enters the inlet subassembly 10 through the first fresh air inlet 20. From the first fresh air inlet 20, the fresh air flows into the first channel 66, through the filter 80 and the evaporator 82, and exits the inlet subassembly 10 through the outlet 90. The fresh air entering through the first fresh air inlet 20 is restricted from flowing out of the inlet subassembly 10 through the recirculation inlet 50 by the recirculation door 70. The recirculated air flowing in through the recirculation inlet 50 flows through the second channel 68, through the filter 80 and the evaporator 82, and exits the inlet subassembly 10 through the outlet 90. The recirculated airflow is restricted from exiting the inlet subassembly through the second fresh air inlet 22 by the second fresh air door 42. Thus in the two-layer mode, the fresh air and the recirculated air are kept separate through the inlet subassembly 10, as well as any suitable two-layer blower and two-layer heater case to which the inlet subassembly 10 is connected to. As a result, the recirculated air may be directed to a lower portion of the passenger cabin to reduce warmup time in a heating mode, and the fresh air may be directed to an upper portion of the passenger cabin to reduce the possibility of window fogging.

The present disclosure thus advantageously provides for an inlet subassembly 10 that divides fresh and recirculated air streams to prevent mixing of fresh and recirculated air, and prevent unfiltered/conditioned RAM air from entering through the recirculation inlet 50 using only three airflow control doors: the first fresh air door 40, the second fresh air door 42, and the recirculation door 70. The use of only three airflow control doors advantageously results in the inlet subassembly 10 being lighter, less costly, easier to assemble, and smaller than previous inlet subassemblies, which require more than three airflow control doors. Furthermore, the use of only three airflow control doors results in a simplified system requiring fewer airflow door control linkages as compared to inlet subassemblies using more than three doors.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An inlet subassembly for a heating, ventilation, and air conditioning (HVAC) system, the inlet subassembly comprising:
   a fresh air inlet;
   a fresh air door movable to an open position allowing fresh airflow in through the fresh air inlet, and the fresh air door movable to a closed position restricting fresh airflow in through the fresh air inlet;
   a recirculation air inlet;
   a partition defining a first airflow channel and a second airflow channel extending from the recirculation air inlet; and
   a recirculation air door adjacent to the recirculation air inlet, the recirculation air door movable to a closed position restricting recirculated airflow into both the first airflow channel and the second airflow channel, the recirculation air door movable to an open position permitting recirculated airflow into both the first airflow channel and the second airflow channel, and the recirculation air door movable to a two-layer position in which the recirculation air door restricts recirculated airflow into the first airflow channel and permits recirculated airflow into the second airflow channel;

wherein the fresh air door is rotatable about a first rotation axis and the recirculation air door is rotatable about a second rotation axis that is perpendicular to the first rotation axis.

2. The inlet subassembly of claim 1, wherein the fresh air inlet and the recirculation air inlet face 90° relative to each other.

3. The inlet subassembly of claim 1, wherein the first airflow channel and the second airflow channel both extend from the recirculation air door to a filter and an evaporator of the inlet subassembly.

4. The inlet subassembly of claim 3, further comprising an outlet on sides of the filter and evaporator opposite to the partition.

5. The inlet subassembly of claim 1, wherein the fresh air inlet is in fluid cooperation with the first airflow channel such that fresh airflow flowing through the fresh air inlet flows into the first airflow channel.

6. The inlet subassembly of claim 5, wherein the fresh air inlet is vertically aligned with the first airflow channel.

7. The inlet subassembly of claim 1, wherein:
the fresh air inlet is a first fresh air inlet and the fresh air door is a first fresh air door;
the inlet subassembly further comprises a second fresh air inlet adjacent to the first fresh air inlet, and a second fresh air door movable to control fresh airflow through the second fresh air inlet; and
wherein the second fresh air inlet is in fluid cooperation with the second airflow channel such that fresh airflow flowing through the second fresh air inlet flows into the second airflow channel.

8. The inlet subassembly of claim 7, wherein the first fresh air inlet is vertically aligned with the first airflow channel and the second fresh air inlet is vertically aligned with the second airflow channel.

9. An inlet subassembly for a heating, ventilation, and air conditioning (HVAC) system, the inlet subassembly comprising:
a recirculation air inlet;
a partition defining a first airflow channel and a second airflow channel extending from the recirculation air inlet to a filter and an evaporator of the inlet subassembly;
a recirculation air door movable to a closed position restricting recirculated airflow into both the first airflow channel and the second airflow channel, the recirculation air door movable to an open position permitting recirculated airflow into both the first airflow channel and the second airflow channel, and the recirculation air door movable to a two-layer position in which the recirculation air door restricts recirculated airflow into the first airflow channel and permits recirculated airflow into the second airflow channel;
a first fresh air inlet in fluid communication with the first airflow channel;
a first fresh air door at the first fresh air inlet;
a second fresh air inlet in fluid communication with the second airflow channel; and
a second fresh air door at the second fresh air inlet;
wherein the first fresh air door and the second fresh air door both rotate about a first rotation axis; and
wherein the recirculation air door is rotatable about a second rotation axis extending perpendicular to the first rotation axis.

10. The inlet subassembly of claim 9, wherein the recirculation air door is between the recirculation air inlet and the partition.

11. The inlet subassembly of claim 9, wherein the recirculation air inlet faces 90° relative to each of the first fresh air inlet and the second fresh air inlet.

12. The inlet subassembly of claim 9, wherein the first fresh air inlet is vertically aligned with the first airflow channel and the second fresh air inlet is vertically aligned with the second airflow channel.

13. The inlet subassembly of claim 12, wherein the inlet subassembly further includes an outlet on a side of the filter and the evaporator opposite to the partition.

14. The inlet subassembly of claim 9, wherein:
the first fresh air door and the second fresh air door are independently rotatable; and
in the two-layer position the first fresh air door is open and the second fresh air door is closed such that fresh air flows through the first airflow channel and recirculated air flows through the second airflow channel.

15. The inlet subassembly of claim 9, wherein the inlet subassembly includes a housing defining each one of the recirculation air inlet, the first fresh air inlet, and the second fresh air inlet.

16. The inlet subassembly of claim 9, wherein the first fresh air inlet and the second fresh air inlet are at a top of the inlet subassembly, and the recirculation air inlet is at a side of the inlet subassembly.

17. An inlet subassembly for a heating, ventilation, and air conditioning (HVAC) system, the inlet subassembly comprising:
a recirculation air inlet;
a partition defining a first airflow channel and a second airflow channel extending from the recirculation air inlet to a filter and an evaporator of the inlet subassembly;
a recirculation air door movable to a closed position restricting recirculated airflow into both the first airflow channel and the second airflow channel, the recirculation door movable to an open position permitting recirculated airflow into both the first airflow channel and the second airflow channel, and the recirculation air door movable to a two-layer position in which the recirculation air door restricts recirculated airflow into the first airflow channel and permits recirculated airflow into the second airflow channel;
a first fresh air inlet in fluid communication with the first airflow channel;
a first fresh air door at the first fresh air inlet;
a second fresh air inlet in fluid communication with the second airflow channel; and
a second fresh air door at the second fresh air inlet;
wherein the first fresh air door and the second fresh air door are independently rotatable; and
wherein in the two-layer position the first fresh air door is open and the second fresh air door is closed such that fresh air flows through the first airflow channel and recirculated air flows through the second airflow channel.

* * * * *